United States Patent
Kahn et al.

(10) Patent No.: US 7,917,768 B2
(45) Date of Patent: Mar. 29, 2011

(54) SYSTEM CONTROL VIA CHARACTERISTIC GAIT SIGNATURE

(75) Inventors: Philippe Kahn, Aptos, CA (US); Arthur Kinsolving, Santa Cruz, CA (US)

(73) Assignee: DP Technologies, Inc., Scotts Valley, CA (US)

( * ) Notice: Subject to any disclaimer, the term of this patent is extended or adjusted under 35 U.S.C. 154(b) by 1051 days.

(21) Appl. No.: 11/657,234

(22) Filed: Jan. 23, 2007

(65) Prior Publication Data
US 2008/0175443 A1 Jul. 24, 2008

(51) Int. Cl.
*G06F 21/00* (2006.01)
(52) U.S. Cl. ............ 713/186; 713/156; 713/168; 726/5; 726/16; 726/18
(58) Field of Classification Search .................. 713/155, 713/168, 186, 156; 726/5, 6, 18, 16
See application file for complete search history.

(56) References Cited

U.S. PATENT DOCUMENTS

| 7,096,619 | B2 | 8/2006 | Jackson et al. |
| 2001/0047488 | A1 | 11/2001 | Verplaetse et al. |
| 2006/0080551 | A1 | 4/2006 | Mantyjarvi et al. |
| 2006/0098097 | A1 | 5/2006 | Wach et al. |
| 2007/0005988 | A1 | 1/2007 | Zhang et al. |
| 2007/0177770 | A1* | 8/2007 | Derchak et al. ............... 382/115 |

OTHER PUBLICATIONS

International Search Report and Written Opinion, PCT/US2008/000928, International Filing Date: Jan. 23, 2008, Jun. 10, 2008, 8 pages.
International Preliminary Report on Patentability, PCT/US2008/000928, International Filing Date: Jan. 23, 2008, Mail Date, Jun. 10, 2008, 4 pages.

* cited by examiner

*Primary Examiner* — Matthew B Smithers
*Assistant Examiner* — Paul Callahan
(74) *Attorney, Agent, or Firm* — Blakely, Sokoloff, Taylor & Zafman, LLP; Judith A. Szepesi

(57) ABSTRACT

A device includes an access control element to compare new acceleration data from an accelerometer with registered gait signature associated with an authorized user of a mobile device to determine the identity of the user of the mobile device.

22 Claims, 5 Drawing Sheets

| Initialization Selection |
|---|
| Movement Selection |
| 1) Walk<br>2) Swift Walk<br>3) Walking up Stairs<br>4) Walking down Stairs<br>5) Jogging<br>6) Sprinting<br>7) Running up Stairs<br>8) Running Down Stairs<br>9) Walking in Sand<br>10) Walking up hill<br>11) Walking down Hill |
|  |

Fig. 4

SYSTEM CONTROL VIA CHARACTERISTIC GAIT SIGNATURE

FIELD OF THE INVENTION

Exemplary embodiments relate generally to the technical field of user identification, and more particularly to user identification via a characteristic gait signature.

DESCRIPTION OF THE RELATED ART

There are many types of portable devices that people use for business purposes, entertainment and security. These devices include personal digital assistants (PDAs), portable computers, cellular telephones, digital cameras, personal gaming devices, etc. Along with the portability of these devices comes a risk of loss or theft. These devices may have access codes that a user must enter in order for the unit to turn on. Once a device is turned on, and remains on, an unauthorized user can access the devices data or use the device. As long as the device stays powered on (or charged up), it can readily be used by any user, including unauthorized users. Furthermore, remembering and entering access codes in devices is tedious and has inherent security flaws as access codes may be forgotten by intended parties or discovered by unintended parties.

One prior art solution is to ask the user to enter a password or other validation data each time the device is used. However, this is tedious, and most users prefer not to do so.

SUMMARY

A device includes a control element to compare new acceleration data from an accelerometer with registered gait data associated with registered users of a mobile device to determine the current user of the mobile device.

BRIEF DESCRIPTION OF THE DRAWINGS

The embodiments are illustrated by way of example, and not by way of limitation, in the figures of the accompanying drawings and in which like reference numerals refer to similar elements and in which:

FIG. 4 illustrates one embodiment of a user interface display.

DETAILED DESCRIPTION

The embodiments discussed herein generally relate to an apparatus, system and method to control a device via characteristic gait signatures. The control may, in one embodiment, be access control. In one embodiment, the control may be customization control, for a device which may be utilized by multiple users. Referring to the Figures, exemplary embodiments will now be described. The exemplary embodiments of the invention are provided to illustrate the embodiments and should not be construed as limiting the scope of the embodiments.

Figure 1:
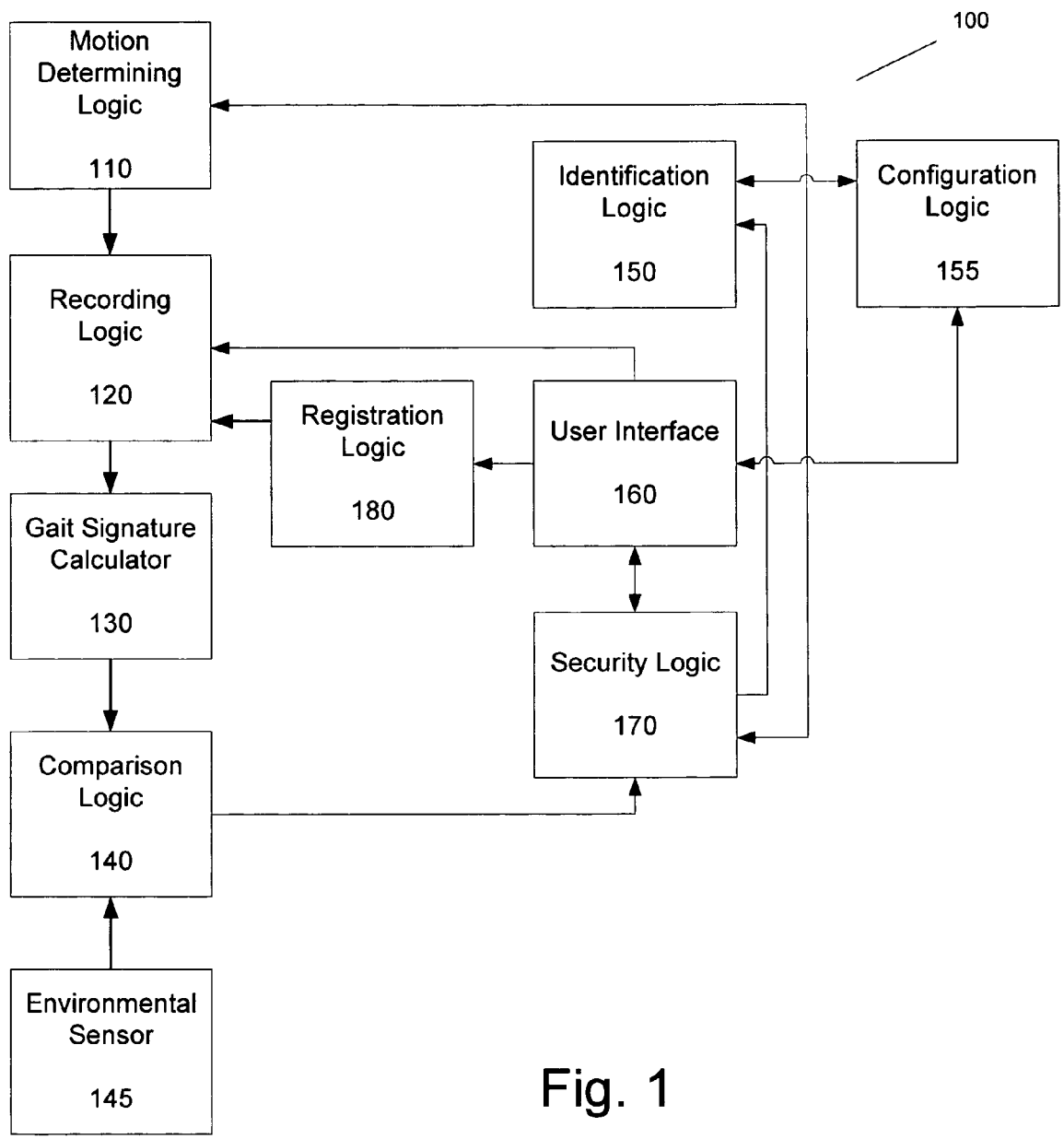
FIG. 1 illustrates a block diagram of an exemplary device to control a device via characteristic gait signatures.

FIG. 1 illustrates a block diagram of one embodiment of a device 100 that includes logic to control a device via characteristic gait signatures. In one embodiment, device 100 can be disposed in a cellular telephone, a digital camera, a personal digital assistant (PDA), a handheld gaming device, a palm computer, and other portable devices.

In one embodiment, device 100 includes motion determining logic 110. In one embodiment, motion determining logic 110 is an accelerometer. In one embodiment, the accelerometer is a three-axis accelerometer. In another embodiment, the motion determining logic 110 may be multiple accelerometers. The motion determining logic 110 senses three dimensional motion. The sensed motion is then converted to digital representations, which can then be recorded and/or used by the system. The three dimensional acceleration data sensed when a user moves (e.g., walking, running, jogging, etc.) can then be used for identification purposes, as described below.

In one embodiment, the accelerometer is powered on when device 100 is powered on. In another embodiment, the accelerometer is powered on upon motion of device 100. In yet another embodiment, the accelerometer is powered on periodically. In another embodiment, the accelerometer is powered on randomly. In still another embodiment, the accelerometer is powered on intermittently, such as every five (5) minutes, ten (10) minutes, thirty (30) minutes, etc. In one embodiment, the accelerometer is not part of the system of the present invention. Rather, the accelerometer data is received from an external accelerometer.

In one embodiment, device 100 may include a user interface 160 which may include one or more of: a resistive digitizer (touch screen), key pad/board, curser/control device, microphone, speaker(s), display screen, etc. to enable the user to interact with the device.

In one embodiment, the gait identification system is initialized by registration logic 180. In one embodiment, for initial registration, registration logic 180 requests that a user perform various types of motion. In one embodiment, this request may be made through user interface 160. In another embodiment, this request may be made via a separate instruction set which may be made available to the user, or through other means. In another embodiment, this registration step may be performed automatically during a first period of use. For example, during a first day or week of use, the system may log the gait characteristics of the user. The types of motion may include styles of gait such as walking, brisk walking, walking up/down stairs, running, jogging, walking in snow/sand, sprinting, walking up/down a hill, etc.

In one embodiment, the user may interact with registration logic 180 at any time. In one embodiment, if the user starts to use different gaits because of environmental or physical changes, the user may record the new gait via registration logic 180.

Recording logic 120 records the accelerations. In one embodiment, the data is stored in a temporary buffer. In one embodiment, the data is stored in a storage device, such as random access memory, flash memory, a hard drive, or other storage.

Gait signature calculator 130 receives the recorded acceleration data from recording logic 120 and computes/calculates gait signatures from the recorded acceleration data. In one embodiment, gait signature calculator 130 abstracts the gait data into comparison points. For example, the gait comparison points may be a combination of cadence (number of steps per time), step size (vertical v. horizontal acceleration during the step), and speed of downward step (i.e. acceleration on downward movement of step). Alternate comparison points may be utilized. Gait signature calculator 130 calculates these comparison points. In one embodiment, during the registration phase gait signature calculator 130 calculates gait signature comparison points for the various types of gaits recorded for a user.

In another embodiment, the gait signature calculator 130 computes the average acceleration data over a predetermined time. In this embodiment, the pattern of averaged gait accelerations is stored for the various type of gait.

The acceleration data for the current gait is calculated by the gait signature calculator 130. The gait data for the current motion is then passed to the comparison logic 140.

Comparison logic 140 compares previously stored gait signatures, or gait comparison points, with current gait data and returns a result. In one embodiment, comparison logic 140 outputs a result that either indicates that the gait data matches one of the stored gait signatures, or that the gait data does not match any stored gait signature, or that the gait data is inconclusive. In one embodiment, the output is passed to identification logic 150. In one embodiment an error or tolerance off-set is used to account for slight variations in a user's gait, which can be caused by several factors, such as weather conditions, health conditions, ground/street conditions, loading conditions (e.g., carrying packages, backpack, etc.), etc. In one embodiment, the comparison logic 140 compares the gait data to each of the possible registration gaits. Note that in one embodiment, the registration gaits may correspond to more than one user. In one embodiment, the comparison logic 140 performs a preliminary comparison based on cadence, and only those gaits which match the cadence (i.e. amble, slow walk, normal walk, fast walk, very fast walk) are matched with respect to the other data.

In one embodiment, an environmental sensor 145 is used to determine environmental conditions. In one embodiment, environmental conditions can include temperature, barometric pressure, humidity, wind data, pollen counts, and other data available about the environment. In one embodiment, the environmental sensor 145 is a temperature sensor used to determine current temperature. The environmental data as determined by one or more environmental sensors 145 is converted to data and associated with the new acceleration data. In this embodiment, the system associates the environmental data with the step data to increases comparison accuracy, as the environment affects gait characteristics. For example, in one embodiment when a gait signature is compared to new acceleration data, if the temperature associated with the gait signature and the temperature associated with the new acceleration data differ by a predetermined temperature range, device 100 determines that a comparison result is inconclusive.

In one embodiment, acceleration data is constantly recorded when device 100 is in motion. In one embodiment, the gait signatures are compared to the new gait data continuously, as the device moves. In one embodiment, the gait data is only compared to the gait signatures when a series of steps—as identified by cadence—stop. That is, every time the device's motion indicates a change, the current gait data is compared to the gait signatures. Since it is extremely unlikely that someone could steal a device or pass a device to another user in motion, and maintain the same cadence as the original owner, by only verifying gait when the gait changes, the power consumption of the security system is reduced.

The identification logic 150 processes the comparison result received from comparison logic 140 to determine whether the user of the device is a registered user. In one embodiment, if the user of the device is not one of the registered users, the security logic 170 determines whether or not to lock down the device.

If the identification logic 150 determines that the gait data does not match any of the gait signatures, in one embodiment, it sends the data to the security logic 170 to prohibit access to the device 100. In one embodiment, the security logic 170 prompts the user through the user interface to enter an access code, instead of prohibiting access. If the user enters the correct access code, the security logic 150 again permits access to the device.

In one embodiment, the system suggests to the user that the new gait signature should be registered. If the user chooses to do so, the registration logic 180 is initialized. In one embodiment, the newly calculated gait data is automatically registered into system as a valid gait signature for the user.

If the identification logic 150 determines the gait signatures are the same, device 100 remains active. In one embodiment, if the device is a multi-user device, the identification logic 150 can identify the current user for the device. For example, a mobile communications device may be shared among multiple users. Using the gait signatures of each of the users, the identification logic 150 can identify the actual current user of the device. This may be used, in one embodiment, to configure the device appropriately for the identified user. For example, in a warehouse setting, a supervisor and a worker may both use a handheld reader. However, the supervisor may utilize different tools on the handheld reader than the worker. If the identification logic 150 identifies the current user as the worker, a configuration logic 155 may configure the device to be used by the worker. Similarly, if the supervisor is identified, the configuration logic 155 may configure the device to be used by the supervisor. Similarly, in a family setting, a mobile device may be utilized by multiple users such as parents and children. The tools available, and in one embodiment, the layout of the screens, the applications available, and the set-up of various applications which can be registered to multiple users may be altered by configuration logic 155. For example, if multiple users are registered in an instant messaging application, the configuration logic 155 may automatically configure the device to log into the instant messaging application with the correct identification. In one embodiment, a mobile device may be configured to be used by any number of different individuals. In one embodiment, during registration or set-up, the applications, settings, and other features associated with each user may be selected. In one embodiment, once a user is registered, he or she may alter the applications and settings associated with that user.

As gait signatures can change with age, injuries, weather, and environment, change of weight, etc., it would not be extraordinary for a user to have to re-initialize gait signatures periodically. In one embodiment, the user can voluntarily re-initialize the device at any time. In one embodiment, the system may compare current gait data, within the acceptable range for a match with the gait signature, and update gait signature data. In this way, the user need not reinitialize the device, if the overall gait patterns shift slowly over time. However, if there is a rapid significant change, for example as occasioned by an injury, re-registration may be necessary.

In one embodiment, security logic 170 starts/ends the cycle of obtaining and comparing gait signatures and granting/denying access to the device. In one embodiment the security logic 170 determines when it is time to re-verify identity. As noted above, this may be periodic, constant, or depend on changes in motion. In one embodiment, the security logic 170 randomly chooses a time to prompt the user to initialize gait signatures through the user interface. In this embodiment, a predetermined range is selected (for example, thirty minutes to twenty-four hours and a random number generator is used to select the time to initialize gait signatures. In one embodiment, every time the device's motion indicates a change in the gait, the new/changed gait is evaluated.

Figure 2:
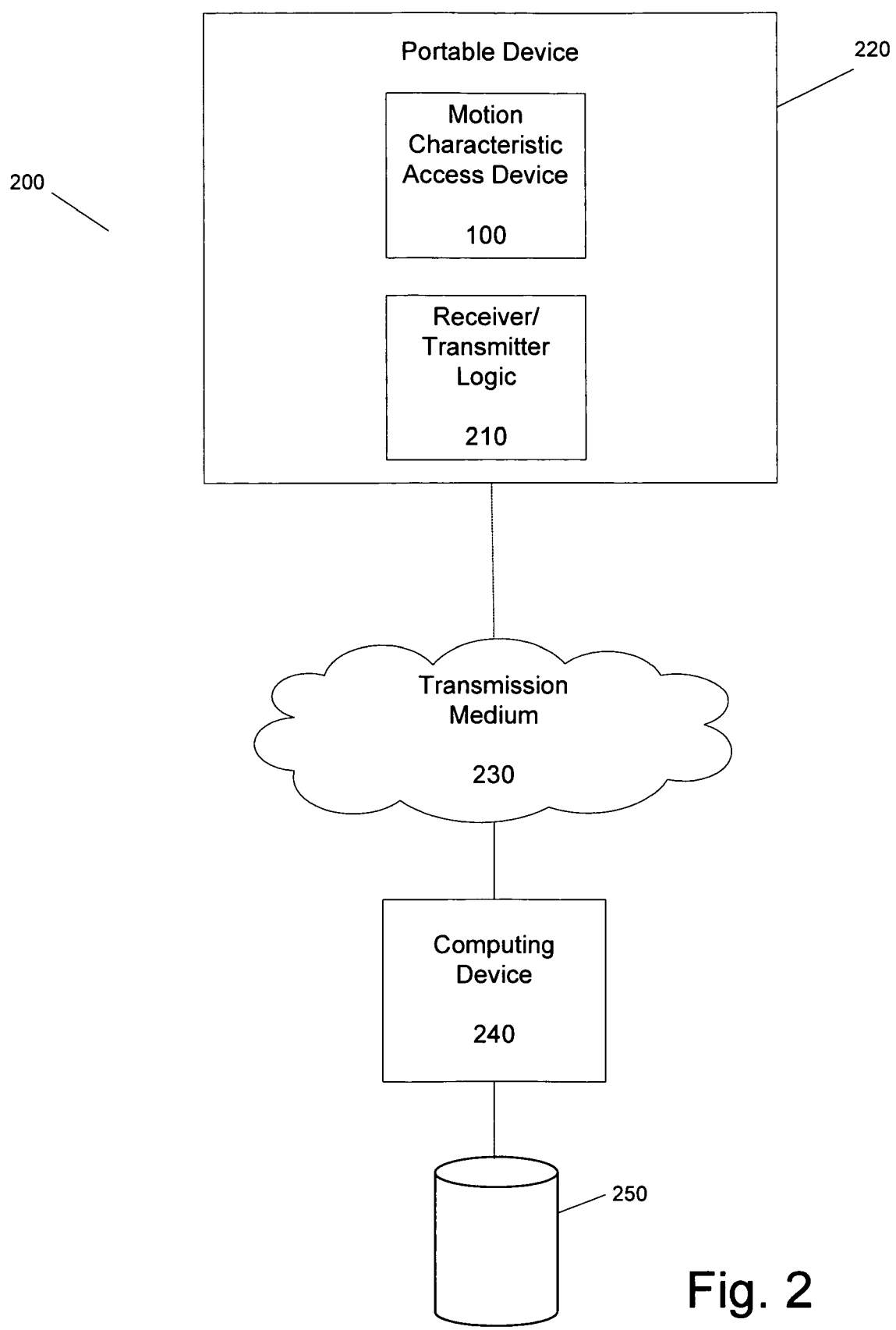
FIG. 2 illustrates one embodiment of an exemplary system.

FIG. 2 illustrates an embodiment including system 200. System 200 includes device 100 and transmitter/receiver logic 210, both disposed in a portable device 220. Portable device 220 can be any portable device, such as a cellular telephone, a digital camera, a PDA, a handheld gaming device, a mobile computer, etc. In one embodiment, the gait signatures are recoded by recording logic 120 and transmitted through transmission medium 230 to computing device 240 and stored on storage device 250. Transmission medium 250 can transmit/receive data through wireless telephony communications, wireless Internet communications, etc. Computing device 240 can be a server or any other remote computing device. Storage device 250 can be any temporary or permanent storage device, such as databases stored in memory, redundant array of independent disks (RAIDs), flash memory, RAM, etc. In one embodiment, multiple computing devices 250 and multiple storage devices 250 are used to provide distributed storage.

In one embodiment, the gait signature logic 130 and the comparison logic 140 are disposed on remote computing device 240. In this embodiment, the comparison of previous gait signatures and new gait data is performed on computing device 240. In one embodiment if the compared gait signatures do not match, computing device 240 transmits a signal to portable device 220 to lock it. In one embodiment, the computing device 240 or portable device 220 may provide the ability to remove the lock using an access code. If the access code entered is incorrect, in one embodiment, the system may be locked permanently. In one embodiment, the computing device 240 may further send an alert through an alternate communications method to the user. In one embodiment, the device may be unlocked only through sending a predetermined message through an alternate channel to the device. This ensures that even if someone steals the device and has or guesses the access code, the device remains unusable unless the alternate channel is also compromised. In one embodiment, the alternate channel may be sending an SMS message to the device with a one-time unlock code provided by the computing device 240 via the alternate communication channel to the user.

In one embodiment, once portable device 220 is permanently locked down, a user has to contact the controlling party and provide authentication information to receive/reset the access code and have portable device accessible. In one embodiment if the portable device is shut down, the user is sent a message through a different communications path, called, or otherwise notified of the access failure. In this embodiment, if portable device 220 is locked, the owner would be notified that any unauthorized users are denied access to use the portable device.

In one embodiment, gait signatures are recorded on device 100 and transmitted to computing device 240 when bandwidth is cheap or in low use. In one embodiment, this occurs when the device is not being used. In one embodiment, once the gait signatures are transmitted to computing device 240, the gait signatures are erased from memory in device 100. In one embodiment, when gait signature comparison is required, the previous recorded gait signature is retrieved from the computing device 240 and transmitted to portable device 220, to enable a local comparison to be made. In one embodiment, the cadence comparison may be made on the computing device 240 while the remaining comparisons are made on the device 100. In one embodiment, the comparison of gait signatures is completed by device 100. The steps of the identification described herein may be distributed between portable device 220 and remote computing device 240 in various ways.

Figure 3A:
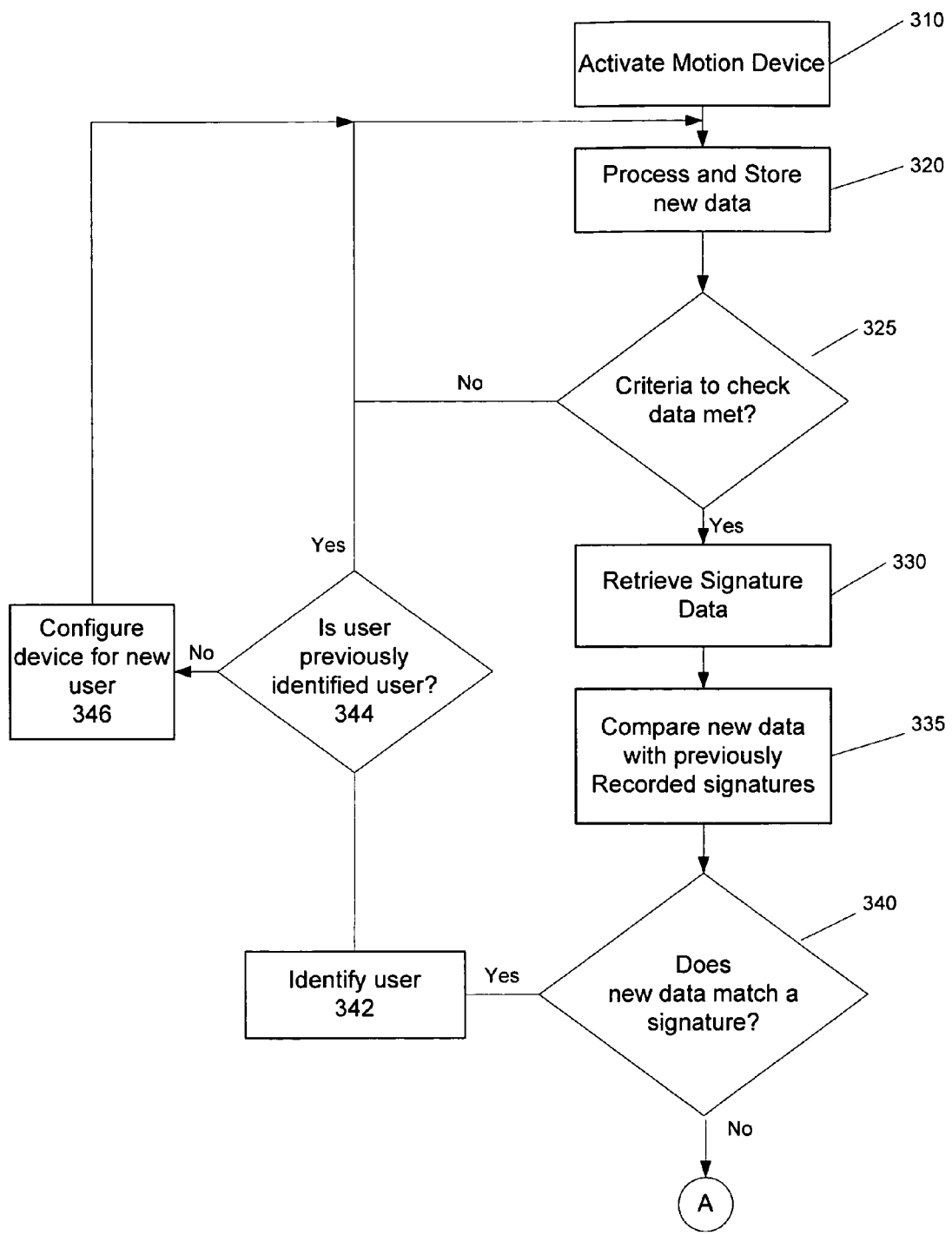
FIG. 3A-B illustrates a flow diagram of an exemplary process.
Figure 3B:
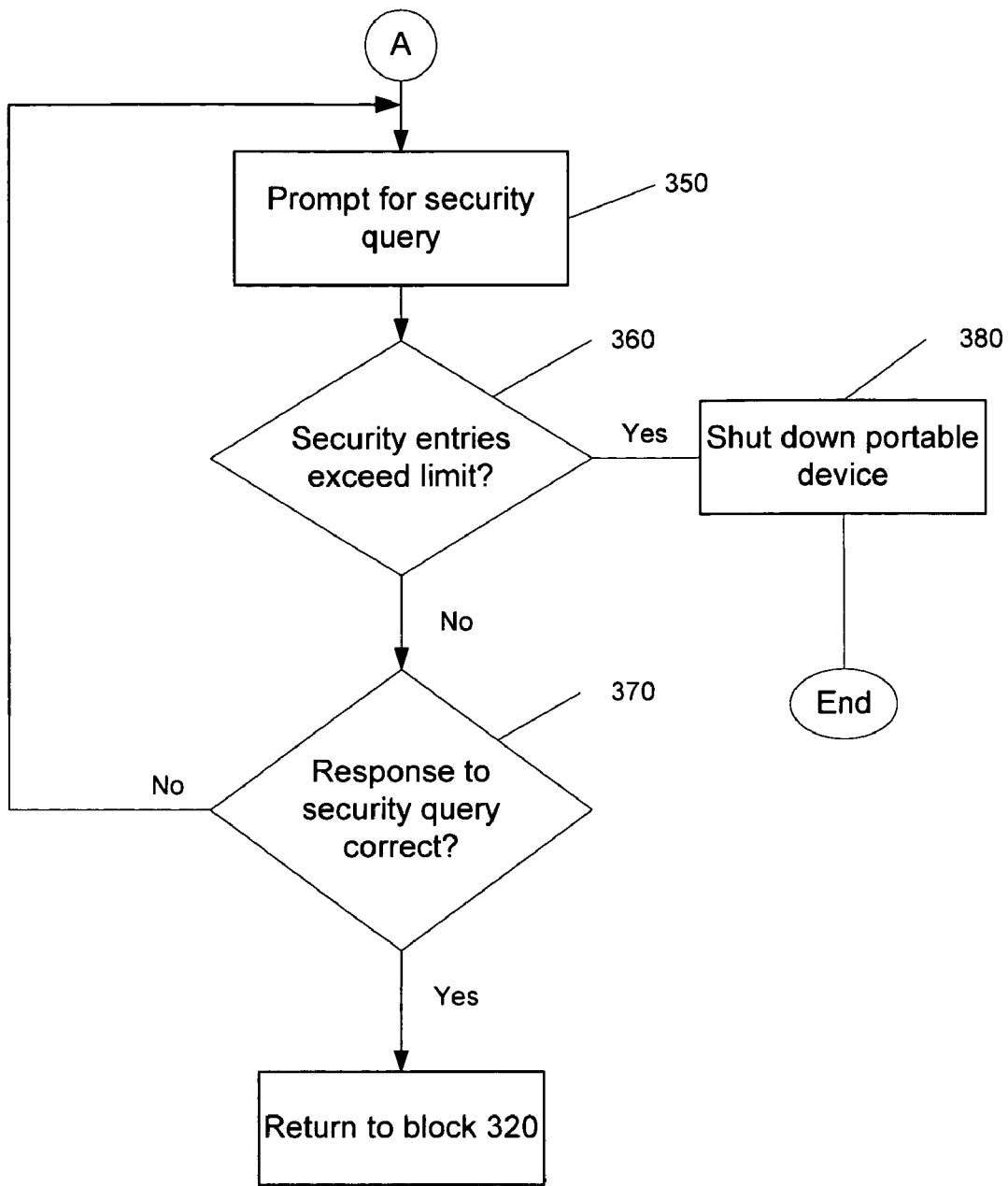

FIG. 3A-B illustrates a flowchart of one embodiment of the process. Process 300 starts with a motion device (e.g., an accelerometer) being activated in block 310. In one embodiment, this may occur in response to a predetermined event, such as initialization of accelerometer data, a predetermined security criteria, etc. In one embodiment, the accelerometer may be active otherwise as well, but accelerometer data is forwarded to the identification system only periodically. As noted above, the periodicity may be determined by time, by change in cadence, or by another method.

After the accelerometer data is received, at block 320 acceleration data is processed and recorded/stored. At block 325 the process determines if verification criteria are met (i.e., gait data has been calculated from the acceleration data, and a match is being evaluated.). If at block 325 the process determines that the verification criteria to verify gait signature are met, any previously recorded gait signatures are retrieved. Otherwise, the process returns to block 325 until the security verification criteria is met. In one embodiment, the verification criteria include having sufficient data. In one embodiment, sufficient data is at least two full strides (gait cycles) having been recorded.

Once the verification criteria is/are met, at block 330, the process compares currently recorded gait data with the registered gait signatures. At block 340, the process determines whether the current gait data and one of the registered gait signatures match (i.e., within a predetermined range of error). If the gait data matches the gait signature, the process continues to block 342.

At block 342, the user associated with the matched gait signature is identified. In one embodiment, multiple users may have recorded gait signatures for the device.

At block 344, the process determines whether the user is the last identified user of the device. If so, the process returns to block 325, to await a next verification cycle. Otherwise, the process, at block 346, configure the device for the newly identified user, and sets the value of the last identified user to the newly identified user. The process then returns to block 325, to await the next verification cycle.

If the gait data and the recorded gait signatures are found not to match, at block 350 the process, in one embodiment, prompts a user to enter a security/access code. In an alternative embodiment, the system may simply lock the device. In an alternative embodiment, the system may send an alert to the user. In an alternative embodiment, the system may send an alert to the user through another path, i.e. not through the device itself.

At block 360, the process determines if the number of entered security/access codes exceeds a predetermined number of tries. If the entry does not exceed the predetermined number of tries, the process continues to block 370, where it is determined whether the security/access code is correct. If the security/access code is correct, the process unlocks the user's system. In one embodiment, the process then returns to block 310 to permit the user to record new gait information. If the security code entered is not correct, process 300 returns to block 350, to query again.

If the security/access code entry attempts exceed a predetermined number, as determined at block 360, the process continues to block 380. At block 380, access of a portable device is denied. In one embodiment, the portable device is shut down, and the user is requested to provide identification through some other means in order to reactivate the device. In one embodiment this security implementation may be distributed between a portable device (such as device 220) and a remote computing device (such as device 240) in various ways.

FIG. 4 illustrates an embodiment of a user display on a user interface where the user either selects the type of gait to initialize a portable device to (e.g., device 100/portable device 220). As illustrated various types of gaits can be entered/maintained.

In one embodiment, device 100 (see also FIG. 2, portable device 220) includes a machine-readable medium on which is stored one or more sets of instructions (e.g., software) embodying any one or more of the methodologies or functions described herein. The software may also reside, completely or at least partially, within the recording logic 120 and/or another device/machine, such as a processor, during execution thereof by device 100. The software may further be transmitted or received over a network via a network interface device (see, e.g., FIG. 2 receiver/transmitter logic 210).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present invention. The machine-readable medium includes any mechanism that provides (i.e., stores and/or transmits) information in a form readable by a machine (e.g., a computer, PDA, cellular telephone, etc.). For example, a machine-readable medium includes memory (such as described above); magnetic disk storage media; optical storage media; flash memory devices; biological electrical, mechanical systems; electrical, optical, acoustical or other form of propagated signals (e.g., carrier waves, infrared signals, digital signals, etc.). The device or machine-readable medium may include a micro-electromechanical system (MEMS), nanotechnology devices, organic, holographic, solid-state memory device and/or a rotating magnetic or optical disk. The device or machine-readable medium may be distributed when partitions of instructions have been separated into different machines, such as across an interconnection of computers or as different virtual machines.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Accordingly, the specification and drawings are to be regarded in an illustrative rather than a restrictive sense.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

What is claimed is:

1. An apparatus comprising:
    an identification logic implemented by a processor to compare new acceleration data from an accelerometer in a mobile device with a registered gait signature associated with an authorized user of the mobile device and stored in a memory, to determine an identity of the user of the device, the identification logic to prompt a user to enter a security entry when the user is not successfully identified based on the gait signature;
    a gait signature calculator to update the registered gait signature based on the new acceleration data when a user correctly enters the security entry; and
    a configuration logic to configure the mobile device to a preset configuration profile associated with the identified user based on the new acceleration data.

2. The apparatus of claim 1, further comprising:
    the gait signature calculator further to update the registered gait signature based on the new acceleration data when the user is successfully identified based on the comparison.

3. The apparatus of claim 1, further comprising a sensor to determine environmental data, wherein the environmental data is associated with the new acceleration data.

4. The apparatus of claim 1, further comprising:
    a security logic to grant access to the mobile device when the new acceleration data matches the registered gait signature, and to deny access to the device when the new accelerometer data does not match the registered gait signature.

5. The apparatus of claim 1, wherein the mobile device provides one or more of the following functionalities: personal digital assistant (PDA), cellular telephone, portable gaming device, portable computing device, digital camera, and personal entertainment device.

6. The apparatus of claim 1, further comprising:
    registration logic to cumulatively record adjustments to the registered gait signature when the new acceleration data is received and determined to be associated with the user.

7. The apparatus of claim 1, further comprising:
    an environmental sensor to receive environmental data, the environmental data used to increase accuracy of the identification logic.

8. The apparatus of claim 7, wherein the environmental sensor senses one or more of: temperature, barometric pressure, humidity, wind data, pollen counts, and other data available about the environment.

9. The apparatus of claim 1, further comprising:
    a gait signature calculator to calculate a gait signature based on comparison points.

10. The apparatus of claim 9, wherein the gait comparison points comprise one or more of: cadence, vertical acceleration during a step, horizontal acceleration the step, and acceleration on downward movement of step.

11. The apparatus of claim 1, wherein the mobile device is associated with a plurality of users, each of the user having a configuration profile, wherein:
    the configuration logic configures the mobile device for the identified one of the plurality of users.

12. The apparatus of claim 1, further comprising:
    a user interface to enable the user to enter a security entry when the user is not identified as an authorized user of the device based on the new acceleration data;
    a registration logic to update the gait signature data based on the collected acceleration data, when the security entry is a correct security entry.

13. A system comprising:
    a portable device including an accelerometer coupled to a security module and a first memory;
    a transmitter to transmit acceleration data from the portable device to a server;

a comparison logic to determine if the acceleration data matches a characteristic gait signature of a user;

a security logic to restrict access to the device if the acceleration data does not match the characteristic gait signature and the user does not enter a correct security entry;

a gait signature calculator to update the characteristic gait signature based on the acceleration data when a user correctly enters the security entry; and a configuration logic to configure the portable device for the user recognized based on the identified gait signature or the security entry by applying a configuration profile.

14. The system of claim 13 wherein the portable device includes the functionality of one or more of the following: personal digital assistant (PDA), a cellular telephone, a portable gaming device, a portable computer device, a digital camera and a personal entertainment device.

15. The system of claim 13, wherein the server transmits a signal to the security module to shut down the portable device.

16. The system of claim 13, wherein acceleration data is stored for a plurality of users.

17. A method comprising:
registering, on a mobile device, one or more gait signatures based on acceleration data associated with a gait of one or more users;
collecting acceleration data;
determining if the acceleration data matches one of the gait signatures;
identifying an authorized user to use the device if the acceleration data matches one of the gait signatures;
when the user is not identified based on the gait signatures, prompting the user to enter a security entry and updating the gate signature data based on the collected acceleration data, when the correct security entry is received; and
configuring the device to a preference of the identified authorized user by applying a configuration profile.

18. The method of claim 17, wherein the comparison is performed on a remote computing device.

19. A method comprising:
registering, on a device, one or more gait signatures based on acceleration data associated with a gait of one or more users;
collecting acceleration data;
determining if the acceleration data matches one of the gait signatures;
identifying an authorized user to use the device when the acceleration data matches one of the gait signatures;
when the user is not identified as an authorized user of the device, prompting the user to enter a security entry and updating the gait signature data based on the collected acceleration data, when the security entry is a correct security entry; and
configuring the device to a preference of the identified authorized user.

20. The method of claim 19, further comprising:
associating environmental data with the collected acceleration data.

21. The method of claim 19, further comprising:
when the authorized user is identified based on the collected acceleration data or the security entry, adjusting the registered gait signature of the authorized user based on the collected acceleration data.

22. The method of claim 19, further comprising:
calculating a plurality of comparison points to identify the gait signature, the plurality of comparison points comprising one or more of: cadence, vertical acceleration during a step, horizontal acceleration the step, and acceleration on downward movement of step.

* * * * *